United States Patent [19]

Yoshida et al.

[11] 4,273,862
[45] Jun. 16, 1981

[54] DIRECT-POSITIVE SILVER HALIDE PHOTOGRAPHIC SENSITIVE MATERIALS

[75] Inventors: Akio Yoshida; Seigo Ebato, both of Nagaokakyo, Japan

[73] Assignee: Mitsubishi Paper Mills, Ltd., Tokyo, Japan

[21] Appl. No.: 78,304

[22] Filed: Sep. 24, 1979

Related U.S. Application Data

[63] Continuation of Ser. No. 906,350, May 15, 1978, abandoned.

[30] Foreign Application Priority Data

Jun. 11, 1977 [JP] Japan .................... 52/69156
Jun. 23, 1977 [JP] Japan .................... 52/74844

[51] Int. Cl.³ .................................... G03C 5/24
[52] U.S. Cl. ........................... 430/412; 430/411; 430/949; 430/596; 430/597; 430/589; 430/582; 430/583; 430/585; 430/586; 430/587; 430/581
[58] Field of Search .............. 430/411, 412, 949, 596, 430/597, 589, 582, 583, 585, 586, 587, 581

[56] References Cited

U.S. PATENT DOCUMENTS

| | | | |
|---|---|---|---|
| 2,855,301 | 10/1958 | Larson et al. | 430/423 |
| 2,944,897 | 7/1960 | Shirk | 430/949 |
| 3,501,311 | 3/1970 | Lincoln et al. | 430/589 |
| 3,518,085 | 6/1970 | Milton et al. | 430/448 |
| 3,576,636 | 4/1971 | Matsui et al. | 430/598 |
| 3,615,517 | 10/1971 | Milton et al. | 430/412 |
| 3,615,519 | 10/1971 | Milton | 430/411 |
| 3,772,030 | 11/1973 | Gilman et al. | 430/589 |
| 3,779,776 | 12/1973 | Vanassche et al. | 430/410 |
| 3,785,822 | 1/1974 | Overman | 430/614 |
| 3,817,753 | 6/1974 | Willems et al. | 430/564 |
| 3,955,996 | 5/1976 | Hinata et al. | 430/569 |
| 3,986,878 | 10/1976 | Hinata et al. | 430/574 |

FOREIGN PATENT DOCUMENTS

| | | | |
|---|---|---|---|
| 48-28224 | 4/1973 | Japan | 430/588 |
| 49-69330 | 7/1974 | Japan | 430/564 |

OTHER PUBLICATIONS

Berriman, et al: "Spectral Sensitization of Mobile Positive Holes," Photographic Science and Engr., vol. 17, pp. 235–244, 1973.

*Primary Examiner*—Won H. Louie, Jr.
*Attorney, Agent, or Firm*—Cushman, Darby & Cushman

[57] ABSTRACT

Direct-positive silver halide photographic sensitive materials of high sensitivity and capable of forming a high-contrast image are obtained by incorporating anion-type cyanine dyes having a polarographic oxidation halfwave potential not less positive than +0.4 V in externally fogged direct-positive silver halide emulsions containing not less than 70 mole-% of bromide. Additional incorporation of a development accelerator such as 2-mercaptoimidazoline improves developability.

17 Claims, No Drawings

DIRECT-POSITIVE SILVER HALIDE PHOTOGRAPHIC SENSITIVE MATERIALS

This is a continuation of application Ser. No. 906,350 filed May 15, 1978.

BACKGROUND OF THE INVENTION

This invention relates to direct-positive silver halide photographic sensitive materials of the lith-type capable of forming a high-contrast image when processed in a lith-developer.

Generally in the field of graphic arts, high-contrast photographic sensitive materials are employed in photographic formation of line images and halftone images (dot images). The image is produced by exposing a lith-type photographic sensitive material suitable for the purpose to a continuous tone original through a screen and developing in a lith-developer containing hydroquinone as single developing agent. In this way, the positive original is reproduced in a negative image which is used in making printing plates by a variety of processes. In one of such processes, the negative image is reproduced again in positive image. Such a process, therefore, requires two steps of treatment for the reproduction of positive image from a positive original by way of intermediary negative reproduction. In recent years, there has been an increasing demand for reproducing a positive image from a positive original in one step. For the purpose of reproducing a positive image from a positive original or reproducing a negative image from a negative original, direct-positive silver halide sensitive materials such as duplicating film have heretofore been employed. When treated in a lith-developer, however, conventional direct-positive silver halide sensitive materials give an image of lower contrast as compared with commercial lith-type photographic sensitive materials so that it was difficult to form a line image and halftone image by using the conventional direct-positive sensitive materials alone, although these sensitive materials are able to reproduce the image reproduced with the lith-type photographic sensitive material.

In a high-sensitivity direct positive silver halide photographic sensitive materials, there are used silver halide emulsions containing silver bromide or silver iodobromide as major constituent. As described in Japanese patent application Laid-Open ("Kokai") No. 69,330/74, such silver halide sensitive materials containing silver bromide or silver iodobromide as major constituent form a low-contrast image upon development in conventionally known lith-developer and, hence, have never been employed for the purpose of producing a high-contrast image. The said patent application disclosed that the above difficulty can be overcome by improving the processing procedure, but no mention was made about the direct-positive silver halide photographic sensitive material.

On the other hand, silver chlorobromide or silver chloroiodobromide emulsions containing major portion of silver chloride have been used in commercial lith-type photographic sensitive materials. Such emulsions have been improved in sensitivity by spectral sensitization. The spectral sensitizers for use in this case must meet the following requirements:

(1) it should not interfere with the photographic feature of especially high contrast, (2) it should not deteriorate the sharpness of halftone image and not interfere with the improvement in quality of the image in small dot, and (3) it should not accompany the formation of color stain.

For such reasons, sensitizing dyes such as merocyanines, cyanines of the intramolecular salt type and cyanines of the anion type have been preferred. Further, joint use of such dyes has been disclosed in Japanese patent application Laid-Open ("Kokai") No. 28,224/73. However, no disclosure has ever been made about the high-sensitivity direct-positive silver halide photographic materials containing silver bromide or silver iodobromide as major sensitive material.

SUMMARY OF THE INVENTION

Taking into account the technical background mentioned above, the present inventors made extensive studies to develop a lith-type direct-positive silver halide photographic sensitive material capable of producing a high-contrast image and, as a result, found that a lith-type direct-positive silver halide photographic sensitive material is obtained by sensitizing a direct-positive silver halide emulsion containing silver bromide or silver iodobromide as major constituent with a cyanine dye of the anion-type.

Therefore, the first object of this invention is to provide a lith-type direct-positive silver halide photographic sensitive material capable of forming a high-contrast image.

The second object of this invention is to provide a high-sensitivity lith-type direct-positive silver halide photographic sensitive material.

The third object of this invention is to provide a high developability lith-type direct-positive silver halide photographic sensitive material capable of producing a high-contrast image.

Other objects and advantages of the invention will become apparent from the following description.

DESCRIPTION OF THE INVENTION

In this invention, the anionic cyanine dyes used are those having a polarographic oxidation halfwave potential not less positive than +0.4 V. Such anionic cyanine dyes have been used in direct-positive silver halide emulsions as spectral sensitizing agents and can be characterized in terms of their polarographic oxidation halfwave potential and polarographic reduction halfwave potential. It is known that there exists a close interrelationship between the spectral sensitizing action and the polarographic oxidation halfwave potential as well as the reduction halfwave potential. As described in, for example, Photographic Science and Engineering, 17, 235–244 (1973) by R. W. Berriman and P. B. Gilman, Jr., only when the oxidation potential of a dye becomes less positive than +0.40 V does hole trapping by the dye inhibit the photobleaching of surface fog. Therefore, in order to spectrally sensitizing the externally fogged direct-positive silver halide emulsion in this invention, there is needed a sensitizing dye having an oxidation halfwave potential not less positive than +0.4 V.

The anionic cyanine dyes for use in this invention are preferably represented by the general formula (I):

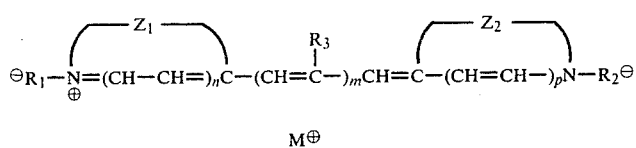

wherein $R_1$ and $R_2$ each represents a sulfoalkyl group (for example, γ-sulfopropyl, or Δ-sulfobutyl group) or a carboxyalkyl group (for example, β-carboxyethyl or γ-carboxypropyl group); $R_3$ represents hydrogen atom, an alkyl group (for example, methyl or ethyl group) or an aryl group (for example, phenyl group); M represents an alkali metal atom (for example, sodium or potassium atom) or ammonium group; and $Z_1$ and $Z_2$ each represents a non-metallic atom group necessary for completing a nitrogen-containing 5-membered or 6-membered heterocyclic nucleus such as, for example, a benzoxazole nucleus (for example, benzoxazole, 5-methoxybenzoxazole, 6-nitrobenzoxazole or 5-chloro-6-nitrobenzoxazole), a benzothiazole nucleus (for example, benzothiazole, 5-nitrobenzothiazole, 6-nitrobenzothiazole or 5-chloro-6-nitrobenzothiazole), a 2-quinoline nucleus (for example, 2-quinoline, 3-methyl-2-quinoline, 5-methyl-2-quinoline, 7-methyl-2-quinoline, 8-methyl-2-quinoline, 6-chloro-2-quinoline, 8-chloro-2-quinoline, 6-methoxy-2-quinoline, 6-ethoxy-2-quinoline, 6-hydroxy-2-quinoline or 8-hydroxy-2-quinoline), a 4-quinoline nucleus (for example, 4-quinoline, 6-methoxy-4-quinoline, 7-methyl-4-quinoline or 8-methylquinoline), a 1-isoquinoline nucleus (for example, 1-isoquinoline or 3,4-dihydro-1-isoquinoline), a 3-isoquinoline nucleus (for example, 3-isoquinoline, 5-methyl-3-isoquinoline, 1-methyl-3-isoquinoline, 6-chloro-3-isoquinoline, 6-methoxy-3-isoquinoline or 8-methoxy-3-isoquinoline), an indolenine nucleus (for example, 3,3-dimethylindolenine, 3,3,5-trimethylindolenine, 3,3,7-trimethylindolenine, 5-hydroxy-3,3-dimethylindolenine, 6-chloro-3,3-dimethylindolenine or 3,3-dimethyl-5-nitroindolenine), an imidazo[4,5-b]quinoxaline nucleus {for example, 1-ethylimidazo[4,5-b]quinoxaline, 1-ethyl-6-nitroimidazo[4,5-b]quinoxaline, 1-phenylimidazo[4,5-b]quinoxaline, 6-chloro-1-diphenylimidazo-[4,5-b]quinoxaline or 1-allylimidazo[4,5-b]quinoxaline}, 2-naphthylidine (1,8) nucleus (for example, 1,8-naphthylidine, 4-methyl-1,8-naphthylidine, 6-methyl-1,8-naphthylidine or 7-methyl-1,8-naphthylidine), 4-naphthylidine (1,8) nucleus (for example, 1,8-naphthylidine, 2-methyl-1,8-naphthylidine, 5-methyl-1,8-naphthylidine, 6-methyl-1,8-naphthylidine or 2,7-dimethyl-1,8-naphthylidine), an oxazolo[4,5-b]-pyridine nucleus {for example, oxazolo[4,5-b]pyridine, 5-methyloxazolo[4,5-b]pyridine or 6-nitrooxazolo[4,5-b]-pyridine}, a thiazolo[4,5-b]pyridine nucleus {for example, thiazolo[4,5-b]pyridine, 5-methylthiazolo[4,5-b]pyridine or 6-nitrothiazolo[4,5-b]pyridine}; a 3-pyrrolo[2,3-b]-pyridine nucleus {for example, 3,3-dimethylpyrrolo-[2,3-b]pyridine} or an imidazo[4,5-b]pyrazine nucleus {for example, 1-ethylimidazo[4,5-b]pyrazine, 1-phenylimidazo[4,5-b]pyrazine or 1-allylimidazo[4,5-b]pyrazine}; and n, m and p each represent 0 or 1.

Of the anionic cyanine dyes used in this invention, those represented by the following formulas (II) and (III) are preferable:

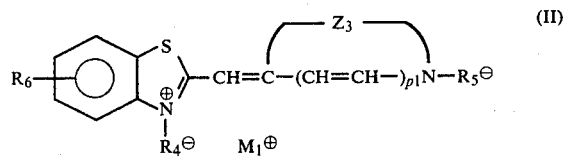

wherein $R_4$ and $R_5$ each represents a sulfoalkyl group or a carboxyalkyl group similar to that represented by $R_1$ or $R_2$ in the formula (I), $R_6$ represents nitro group, a halogen atom or hydrogen atom, $M_1$ represents an alkali metal atom or ammonium group, $Z_3$ represents a non-metallic atom group necessary for completing a nitrogen-containing 5-membered or 6-membered heterocyclic nucleus such as, for example, benzothiazole nucleus, 2-quinoline nucleus, 4-quinoline nucleus, indolenine nucleus, 2-naphthylidine (1,8) nucleus or naphthylidine (1,8) nucleus, and $p_1$ represents 0 or 1;

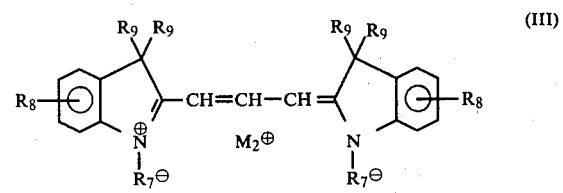

wherein $R_7$ represents a sulfoalkyl group or a carboxyalkyl group, $R_8$ represents nitro group, a halogen atom or hydrogen atom, $R_9$ represents an alkyl group, and $M_2$ represents an alkali metal atom or ammonium group.

Typical examples of dyes used in this invention are listed below.

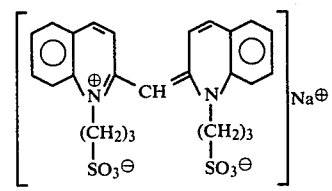

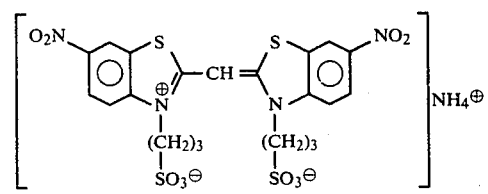

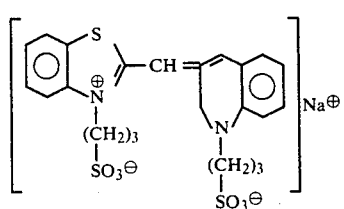

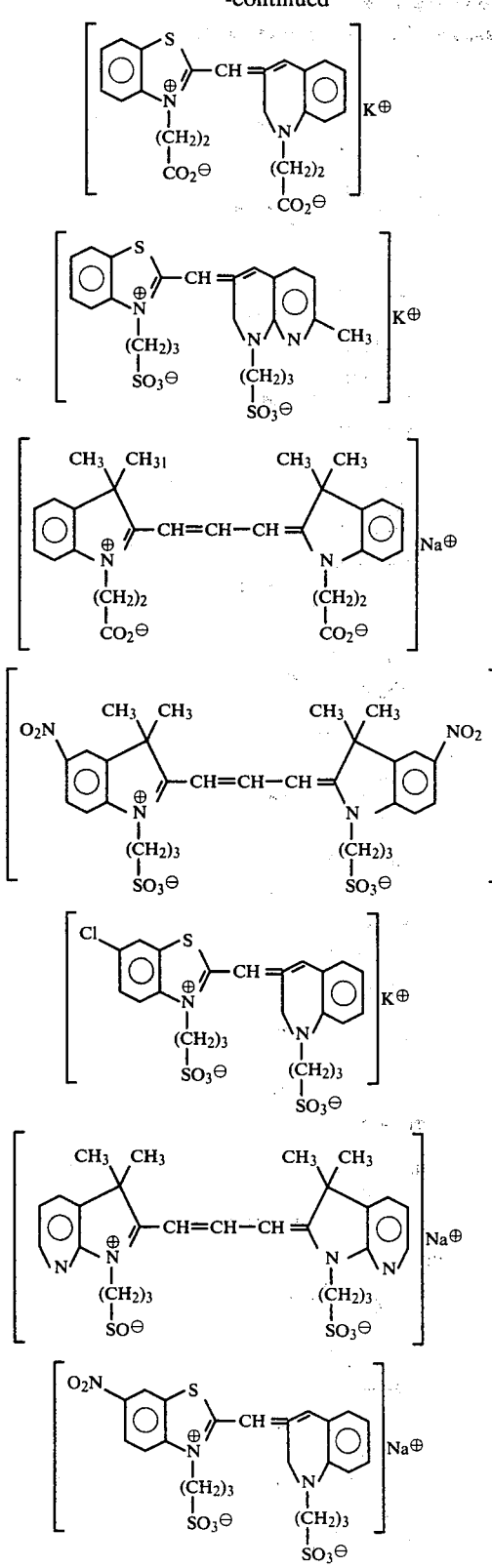

It is convenient to add the dye to the silver halide emulsion just before coating, but they can be added during chemical ripening of the silver halide emulsions or during precipitation of the silver halide(s). The amount of the organic desensitizer used in the present invention depends upon the kind of desensitizer, but is preferably $10^{-5}$ to $10^{-1}$ mole per mole of silver halide.

In the case of such lith-type direct positive silver halide photographic photosensitive materials which contain some of the dyes used in this invention, e.g., dye (3) or (5), when these are developed under a certain practical developing condition, sometimes it is difficult to obtain satisfactory photographic characteristics, e.g., contrast and density. In some modified embodiments of this invention, especially preferably photographic materials which use said dyes, developing accelerators may be contained in the constructive layers of the photographic materials, if necessary. Although the desirable effect of development accelerators is already known, the effectiveness varies to a great extent according to the silver halide emulsion factors such as, for example, halogen composition, procedure of the second ripening, type of the sensitizing dye, and the like. For each silver halide photographic sensitive material, a suitable accelerator is selected in accordance with the factors of particular emulsion and the development procedure used.

The development accelerator used in this invention is selected in the following way:

A specimen is prepared by coating a lith-type direct-positive emulsion containing the above-noted anionic cyanine dye on a transparent film support at a coverage of 3.2 g Ag/m² and the specimen is developed at 20° C. for 3 minutes in a developer solution (I) of the following composition:

| Developer solution (I) | |
|---|---|
| Water (at about 30° C.) | 500 ml |
| Anhydrous sodium sulfite | 30 g |
| Paraformaldehyde | 7.5 g |
| Sodium hydrogen sulfite | 2.2 g |
| Boric acid | 7.5 g |
| Hydroquinone | 22.5 g |
| Potassium bromide | 1.6 g |
| Water to | 1 liter |

The developed specimen will show an optical transmission density of 0.5 at the most. If the same specimen shows an optical transmission density of at least 2.0 on development at 20° C. for 3 minutes in the same developer solution (I) to which 0.1 to 10 mg per liter of a development accelerator has been added, the development accelerator is a preferable one. If incorporated in the lith-type direct-positive silver halide photographic sensitive material, such a development accelerator will exhibit a desirable development-accelerating effect without injuring the high-contrast characteristic of the sensitive material of this invention.

Examples of suitable development accelerators are mercapto-compounds including:

(1) 2-mercaptoimidazoline and its derivatives, of the general formula

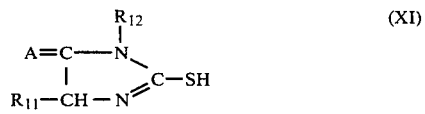

(XI)

wherein $R_{11}$ and $R_{12}$ each represents hydrogen atom or an alkyl group having 4 or less of carbon atoms (for example, methyl and ethyl radicals), A represents oxygen atom, two hydrogen atoms, or one hydrogen atom and an alkyl group having 4 or less carbon atoms, (2) 2-mercaptoimidazole and its derivatives of the general formula

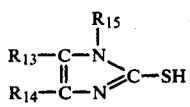

(XII)

wherein $R_{13}$, $R_{14}$ and $R_{15}$ each represents hydrogen atom or an alkyl group having 4 or less carbon atoms, (3) 2-mercaptobenzimidazole and its derivatives of the general formula

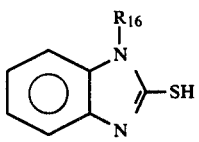

(XIII)

wherein $R_{16}$ represents hydrogen atom or an alkyl group having 4 or less carbon atoms, (4) 2-mercaptotriazole and its derivatives of the general formula

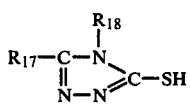

(XIV)

wherein $R_{17}$ represents hydrogen atom or an alkyl group having 4 or less carbon atoms, $R_{18}$ represents hydrogen atom, an alkyl group having 4 or less carbon atoms, allyl group or a group represented by the formula NH-$R_{19}$, where $R_{19}$ represents hydrogen atom or an acyl group having 4 or less carbon atoms (for example, acetyl group or propionyl group), (5) 2-mercaptothiazoline and its derivatives of the general formula

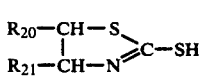

(XV)

wherein $R_{20}$ and $R_{21}$ each represents hydrogen atom or an alkyl group having 4 or less carbon atoms, (6) 2-mercaptothiazole and its derivatives of the general formula

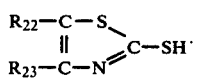

(XVI)

wherein $R_{22}$ and $R_{23}$ each represents hydrogen atom or an alkyl group having 4 or less carbon atoms, and (7) 2-mercaptothiadiazole and its derivatives of the general formula

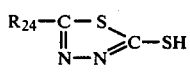

(XVII)

wherein $R_{24}$ represents hydrogn atom, an alkyl group having 4 or less carbon atoms, or a group represented by the formula NH-$R_{25}$, where $R_{25}$ represents hydrogen atom or an alkyl group having 4 or less carbon atoms.

Examples of other suitable development accelerators will be given herinafter.

Typical examples of individual development accelerators used in this invention are as follows:

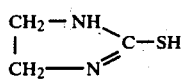

(XI-a)

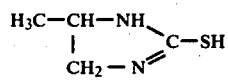

(XI-b)

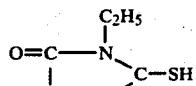

(XI-c)

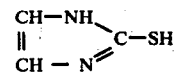

(XII-a)

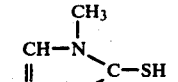

(XII-b)

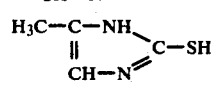

(XII-c)

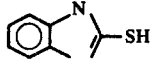

(XIII-a)

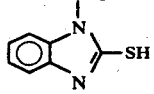

(XIII-b)

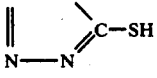

(XIV-a)

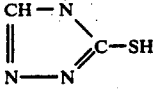

(XIV-b)

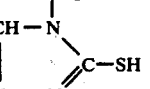

(XIV-c)

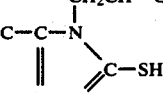

(XIV-d)

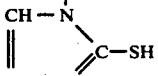

(XIV-e)

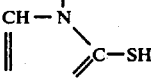

(XIV-f)

(XIV-g)

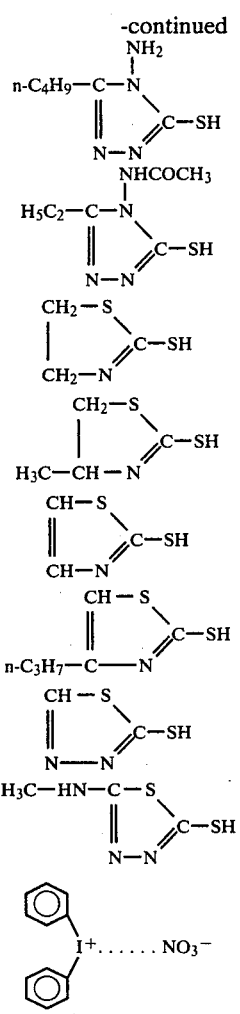

(XIV-h)
(XIV-i)
(XV-a)
(XV-b)
(XVI-a)
(XVI-b)
(XVII-a)
(XVII-b)
(XVIII-a)

In this invention, the development accelerator is added as a solution in water or an alcohol to the silver halide emulsion generally after completion of the second ripening, though it can be added at any stage of emulsion preparation to exhibit its development accelerating effect. Also, the development accelerator can be added to any layer contiguous to the emulsion layer to exhibit similar development accelerating effect. The amount of the development accelerator to be added is generally 0.001 to 1.0 g per mole of silver, although the optimal amount depends on various emulsion factors.

The silver halide in the silver halide emulsion used in this invention preferably has a composition in which the proportion of bromide is not less than 70 mole-%. If a higher sensitivity is desired, a silver iodobromide or chloroiodobromide emulsion containing not less than 95 mole-% of bromide is preferred.

The silver halide emulsion used in this invention can be either monodispersed or non-monodispersed although the former is preferable.

The crystal habit of the silver halide emulsion used in this invention can be either regular or irregular, although the former is preferable.

In this invention, the photosensitive emulsion can be a silver halide emulsion which contains in the silver halide grains nuclei for trapping free electrons and which have been chemically fogged on the crystal surfaces. A procedure for preparing such a type of photosensitive emulsion has been disclosed, for example, in U.S. Pat. No. 3,367,778, No. 3,632,340 and No. 3,709,689.

The silver halide emulsion used in this invention is fogged optically or by use of a chemical fogging agent. The chemical fogging can be favorably carried out by the method of chemical sensitization described by Antoine Hautot and Henri Saubenier in Science et Industries Photographiques, 28, 57–65 (1957).

The silver halide emulsion used in this invention can be fogged with a reducing agent such as, for example, stannous chloride, thiourea dioxide, formaldehyde, an alkali metal arsenite, a hydrazine derivative, or amine borane.

The silver halide emulsion used in this invention can also be fogged with a gold compound such as, for example, chloroauric acid, potassium chloroaurate or potassium aurithiosulfate.

The silver halide emulsion used in this invention can also be fogged by the joint use of a reducing agent and a metal compound more electropositive than silver. Examples of such metal compounds include gold compounds such as potassium choroaurate, platinum compounds such as potassium chloroplatinate, and iridium compounds such as potassium hexachloroiridate.

Further, the silver halide emulsion can be fogged by methods wherein the above-mentioned methods are combined with the use of sulfur-containing sensitizers such as sodium thiosulfate and allylthiourea, or thiocyanate compounds such as potassium thiocyanate.

In this invention, a favorable result is obtained by incorporating in the silver halide emulsion on anionic cyanine dye having a polarographic oxidation halfwave potential and a polarographic reduction halfwave potential the total sum of which is a positive value and, in addition, a known organic desensitizing dye. Such an organic desensitizer is electron receptive, being capable of trapping a free electron, and has a polarographic oxidation halfwave potential of 1.0 V or more positive and a polarographic reduction potential of −1.0 V or less negative. Examples of such desensitizers used in this invention are pinacryptol yellow, phenosafranine, methylene blue, pinacryptol green, 3-ethyl-5-m-nitrobenzylidenerhodanine and 3,3'-diethyl-6,6'-dinitrothiocarbocyanine iodide.

The protective collid used in this invention is generally gelatin, but other protective colloids such as modified gelatins such as phthalated gelatin, hydrophilic polymers such as polyvinyl alcohol and polyvinylpyrrolidone can also be used.

In this invention, it is allowable to add as contrast enhancing agent polyethylene glycol, derivatives thereof, and compounds described, for example, in Japanese Pat. Nos. 25,201/67, 43,437/71 and 21,987/71.

The silver halide emulsion used in this invention may contain various other additives such as stabilizers, whitening agents, ultraviolet absorbers, hardeners, surface active agents, preservatives, plasticizers, matting agents, etc.

The support materials used in this invention are, for example, synthetic resin films such as polyethylene terephthalate and cellulose acetate, synthetic papers, waterproof papers and plastic-laminated papers. If necessary, a subbing layer may be applied over the support material in a known manner. The direct-positive silver halide photographic sensitive material of this invention is obtained by coating the aforementioned direct-positive silver halide emulsion on the above-noted supports and, if necessary, applying an overlayer thereon.

The direct-positive silver halide photographic sensitive material of this invention is processed after exposure in an alkaline developer solution containing hydroquinone as single developing agent. The developer solution employed is that of lith-type well known in art. The direct-positive silver halide photographic sensitive material of this invention is then treated with customary processing baths, such as fixing and bleaching, or a combined bath.

The first feature of this invention is that there is obtained a direct-positive silver halide photographic sensitive material capable of providing a high-quality line image and halftone image (dot image) of high contrast.

The second feature of this invention is that there is obtained a lith-type direct-positive silver halide photographic sensitive material which allows reproduction of a positive image from positive original or reproduction of a negative image from negative original to be carried out in one step of developing treatment.

The third feature of this invention is that there is provided a lith-type direct-positive silver halide photographic sensitive material of high sensitivity.

The fourth feature of this invention is that there is provided a lith-type direct-positive silver halide photographic sensitive material of high contrast and developability.

The invention is illustrated below in detail with reference to Examples, but, of course, the invention is not limited thereto.

EXAMPLE 1

An emulsion was prepared using the solutions of the following composition:

| | | |
|---|---|---|
| I | Gelatin | 60 g |
| | Sodium chloride | 12 g |
| | Water | 400 ml |
| II | Silver nitrate | 120 g |
| | Water | 1,000 ml |
| III | Potassium bromide | 85 g |
| | Potassium iodide | 1.2 g |
| | 28% aqueous ammonia | 100 ml |
| | Water | 900 ml |
| IV | Acetic acid | |

Solution II was added to the rapidly stirred solution I at 40° C. After one minute, solution III was added to the mixture, then ripened at 40° C. for 9 minutes and adjusted to pH 3.0 by adding solution IV. To the resulting mixture was added an aqueous sodium sulfate solution to produce a precipitate which was washed with water. The primitive emulsion thus formed was an emulsion of silver chloroiodobromide containing not less than 95 mole-% of bromide, 0.45μ in mean grain size and cubic in crystal habit (primitive emulsion A). The primitive emulsion A was redispersed and admixed with gelatin followed by an aqueous potassium iodide solution in an amount corresponding to 1 mole-% of potassium iodide per mole of silver halide. To the resulting mixture, after having been adjusted to pH 6.5 and pAg 6.2, was added thiourea dioxide in an amount corresponding to 0.1 mg per mole of silver halide. After having been ripened at 60° C. for 60 minutes, the resulting emulsion was admixed with 2 mg of potassium chloroaurate per mol of silver halide and grain ripened at 60° C. for 60 minutes. Then, pH and pAg were adjusted to 5.0 and 8.0, respectively. The emulsion thus obtained was divided into four equal portions. To each portion was added a sensitizing dye as shown in Table 1. The dyes used for comparison were of the following formulas:

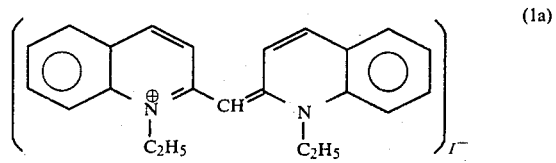

(1a)

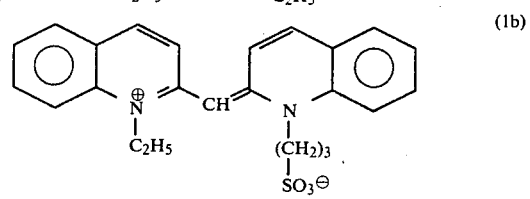

(1b)

To each emulsion were added successively 140 mg/mole of Ag of pinacryptol yellow, a hardener and a surface active agent. The resulting emulsion was coated at a coverage of 2.6 g/m² in terms of silver on a polyethylene terephthalate film provided with a subbing layer and then dried.

The coated film was cut to a suitable size, exposed through a stepped wedge of a density difference of 0.15, and developed in the developer solution D-85 of the following composition at 20° C. for 6 minutes.

| | |
|---|---|
| Water (at about 30° C.) | 500 ml |
| Anhydrous sodium sulfite | 30 g |
| Paraformaldehyde | 7.5 g |
| Sodium hydrogen sulfite | 2.2 g |
| Boric acid | 7.5 g |
| Hydroquinone | 22.5 g |
| Potassium bromide | 1.6 g |
| Water to | 1,000 ml |

The developed film was treated with stop bath and fix bath, washed with water, and dried. The results of sensitometric measurement were as shown in Table 1. $D_{max}$ and $D_{min}$ represent maximum and minimum optical densities, respectively; the sensitivity S represents a relative value of the reciprocal of the magnitude of exposure required to produce an optical density of 1.0; and $\overline{\gamma}$ is the inclination of sensitometric curve between the densities 0.2 and 3.0.

TABLE 1

| Sample No. | Dye | Amount of dye added, mg/mole Ag | S | $\overline{\gamma}$ | $D_{max}$ | $D_{min}$ | Spectral sensitization range (nm) |
|---|---|---|---|---|---|---|---|
| a | Control | — | 100 | 4.2 | 3.84 | 0.03 | — |
| b | (1a) | 300 | 400 | 5.1 | 3.76 | 0.03 | 470–600 |
| c | (1b) | 300 | 390 | 5.2 | 3.73 | 0.03 | 470–600 |
| d | (1) | 300 | 400 | 10 | 3.89 | 0.03 | 470–600 |

As is apparent from Table 1, while dyes of the cation type (1a), intramolecular salt type (1b) and anion type (1) show nearly the same sensitizing efficiency in lith-development, the anion-type dye (1) is distinguished from the others by its high-contrast characteristics, that is, lith-development effect. Thus, the direct-positive silver halide photographic sensitive material of this invention is characterized by its high-contrast gradation and gives a positive halftone image of good quality when exposed to a positive original through a screen to receive exposure and processed with a lith-developer.

EXAMPLE 2

An emulsion was prepared using the solutions of the following composition:

| | | |
|---|---|---|
| V | Phthalate gelatin | 5 g |
| | 0.1 N aqueous potassium bromide solution | 20 ml |
| | Water to | 200 ml |
| | 1 N sulfuric acid to | pH 5.0 |
| VI | Silver nitrate | 136 g |
| | Water to | 400 ml |
| VII | Potassium bromide | 92.8 g |
| | Potassium iodide | 3.3 g |
| | Phthalate gelatin | 16 g |
| | Water to | 400 ml |
| VIII | 6 N Sulfuric acid | |

To the rapidly stirred solution V, while maintaining the temperature at 60° C., were added simultaneously solutions VI and VII over a period of 80 minutes, while maintaining the pAg at 7.4. The resulting emulsion was precipitated by adding solution VIII to adjust the pH to 3.5. The precipitate was washed with water to obtain a primitive emulsion of silver iodobromide containing 97.5 mole-% of bromide. This primitive emulsion was a monodispersed emulsion of cubic crystal grains having a mean grain size of 0.25μ, not less than 95% of the grains having been within ±20% of the mean grain size (primitive emulsion B). The primitive emulsion B was redispersed, mixed with gelatin and adjusted to pH 6.5 and pAg 6.2. Then, 0.2 mg/mole Ag of thiourea dioxide was added to the emulsion, ripened at 65° C. for 45 minutes, admixed with 2 mg/mole Ag of chloroauric acid, and again ripened at 65° C. for 45 minutes. After having been adjusted to pH 5.0 and pAg 8.0, the emulsion was divided into twelve portions. To each portion was added a sensitizing dye shown in Table 2. The sensitizers used for comparison were of the following formulas:

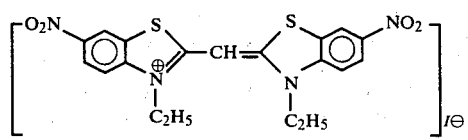
(2a)

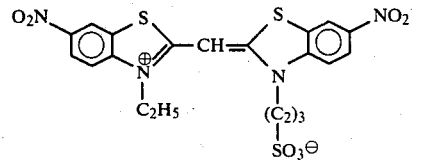
(2b)

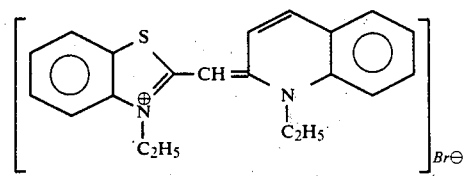
(3a)

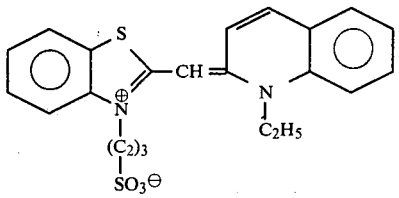
(3b)

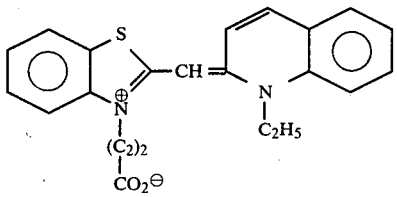
(4b)

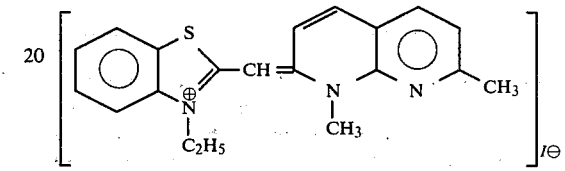
(5a)

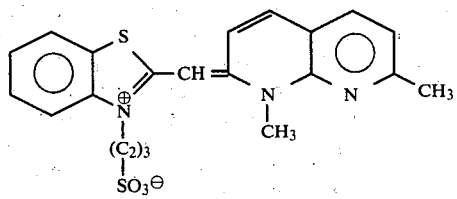
(5b)

To each emulsion were added successively 140 mg/mole Ag of pinacryptol yellow, a hardener and a surface active agent. The resulting emulsion was coated at a coverage of 3.4 g Ag/m² on cellulose triacetate film provided with a subbing layer and then dried.

The coated film thus prepared was cut to a suitable size, exposed through a wedge of a density step of 0.15, and developed in the developer D-85 described in Example 1 at 20° C. for 6 minutes. The developed film was treated with a stop both and a fix bath, washed with water, and dried. The results of sensitometric measurement were as shown in Table 2.

TABLE 2

| Sample No. | Dye | Amount of dye added, mg/mole Ag | S | γ | $D_{max}$ | $D_{min}$ | Spectral sensitization range (nm) |
|---|---|---|---|---|---|---|---|
| e | Control | — | 100 | 4.6 | >4 | 0.03 | — |
| f | (2a) | 300 | 270 | 5.3 | 3.98 | 0.03 | 400–520 |
| g | (2b) | 300 | 260 | 5.2 | 3.96 | 0.03 | 400–520 |
| i | (2) | 300 | 260 | 11 | >4 | 0.03 | 400–520 |
| j | (3a) | 400 | 550 | 4.8 | >4 | 0.03 | 460–580 |
| k | (3b) | 400 | 540 | 4.9 | >4 | 0.03 | 460–580 |
| l | (3) | 400 | 550 | 12 | >4 | 0.03 | 460–580 |
| m | (4b) | 600 | 790 | 5.3 | >4 | 0.03 | 460–580 |
| n | (4) | 600 | 800 | 11 | >4 | 0.03 | 460–580 |
| o | (5a) | 300 | 420 | 4.6 | >4 | 0.03 | 470–590 |
| p | (5b) | 300 | 400 | 4.8 | >4 | 0.03 | 470–590 |
| q | (5) | 300 | 410 | 10 | >4 | 0.03 | 470–590 |

As is apparent from Table 2, the direct-positive silver halide photographic sensitive materials of this invention (samples i, l, n and q) are characterized by their high-contrast gradation and are suitable for use as lith-type photographic sensitive material.

EXAMPLE 3

An emulsion was prepared using the solutions of the following composition:

| | | |
|---|---|---|
| IX | Gelatin | 40 g |
| | Sodium chloride | 12 g |
| | Potassium bromide | 42 g |
| | Potassium iodide | 0.8 g |
| | Water | 1,200 ml |
| X | Silver nitrate | 80 g |
| | 28% Aqueous ammonia | 72 ml |
| | Water | 400 ml |
| XI | Potassium iodide | 0.8 g |
| | Citric acid | 16 g |
| | Water | 400 ml |
| XII | 6 N Sulfuric acid | |

Solution X was added to the rapidly stirred solution IX, while maintaining the temperature at 40° C. After one minute, solution XI was added to the mixture, then ripened at 40° C. for 9 minutes and adjusted to pH 3.0 by adding solution XII. To the resulting mixture, was added an aqueous sodium sulfate to precipitate the emulsion which was then washed with water. The primitive emulsion thus obtained was an emulsion layer of silver chloroiodobromide containing about 75% of bromide, 0.4μ in mean grain size and mostly cubic in crystal habit (primitive emulsion C). The primitive emulsion C was redispersed, admixed with gelatin, then with an aqueous potassium iodide solution in an amount corresponding to 0.5 mole-% of potassium iodide per mole of silver halide, and adjusted to pH 6.5 and pAg 6.0. Then, 0.1 mg/mole Ag of thiourea dioxide and 2 mg/mole Ag of potassium chloroaurate were added to the emulsion and ripened at 60° C. for 75 minutes. After having been adjusted to pH 5.0 and pAg 8.0, the emulsion was divided into four equal portions. To each portion was added a sensitizing dye shown in Table 3. After the addition of 300 mg/mole Ag of pinacryptol yellow, a hardener and a surface active agent, each emulsion was coated at a coverage of 4.0 g Ag/m² on cellulose triacetate film provided with a subbing coating, and dried.

Each sample thus prepared was cut to a suitable size, exposed through a wedge and 0.15 density step, and developed in the developer D-85 described in Example 1 at 20° C. for 6 minutes. The developed sample was treated with stop bath and fix bath, washed with water and dried. The characteristic values obtained by sensitometry were as shown in Table 3.

TABLE 3

| Sample No. | Dye | Amount of dye added, mg/mole Ag | S | $\overline{\gamma}$ | $D_{max}$ | $D_{min}$ | Spectral sensitization range (nm) |
|---|---|---|---|---|---|---|---|
| r | Control | — | 100 | 4.8 | >4 | 0.03 | — |
| s | (6) | 600 | 670 | 11 | >4 | 0.04 | 490–610 |
| t | (7) | 700 | 940 | 14 | >4 | 0.04 | 510–640 |
| u | (8) | 600 | 670 | 12 | >4 | 0.03 | 470–590 |

As is apparent from Table 3, the direct-positive silver halide photographic sensitive materials of this invention are characterized by their high-contrast gradation and are suitable for use as lith-type photographic sensitive materials.

EXAMPLE 4

The primitive emulsion A, prepared in the same manner as in Example 1, was redispersed and mixed successively with gelatin and an aqueous potassium iodide solution in an amount corresponding to 1 mole-% of potassium iodide per mole of silver halide. To the emulsion, after having been adjusted to pH 6.5 and pAg 5.0, was added 2 mg/mole Ag of choroauric acid and the emulsion was ripened at 60° C. for 90 minutes. After having been adjusted to pH 5.0 and pAg 8.0, the emulsion was divided into three equal portions. A sensitizing dye was added to each portion of the emulsion as shown in Table 3. After further addition of 200 mg/mole Ag of pinacryptol yellow, a hardener and a surface active agent, the resulting emulsion was coated at a coverage of 3.4 g Ag/m² on polyethylene terephthalate film and dried.

Each sample thus prepared was cut to a suitable size, exposed through a wedge with 0.15 density step, and developed in the developer D-85 described in Example 1 at 20° C. for 6 minutes. The developed sample was treated with stop bath and fix bath, washed with water and dried. The characteristic values obtained by sensitometry were as shown in Table 4. As is apparent from Table 4, the direct-positive silver halide photographic sensitive materials of this invention are characterized by their high-contrast gradation and are suitable for use as lith-type photographic sensitive materials.

TABLE 4

| Sample No. | dye | Amount of dye added, mg/mole Ag | S | $\overline{\gamma}$ | $D_{max}$ | $D_{min}$ | Spectral sensitization range (nm) |
|---|---|---|---|---|---|---|---|
| v | Control | — | 100 | 4.6 | >4 | 0.03 | — |
| w | (9) | 400 | 480 | 11 | >4 | 0.03 | 500–620 |
| x | (10) | 400 | 420 | 12 | >4 | 0.03 | 470–590 |

EXAMPLE 5

(A) Preparation of a direct-positive emulsion coated specimen for testing development accelerators.

Into 0.01 N aqueous potassium bromide solution containing 5 g of gelatin, while being stirred rapidly and maintained at 60° C., were introduced an aqueous solution containing 3 moles of silver nitrate and a solution containing 4% by weight of gelatin, 2.94 moles of potassium bromide and 0.06 mole of potassium iodide, each at a rate of 4 ml/minute, while maintaining pH and pAg at 4.0 and 7.4, respectively and the resulting silver halide grains were allowed to grow to a grain size of 0.4μ. After addition of gelatin, the emulsion was precipitated with an aqueous sodium sulfate solution and washed with water to obtain a primitive emulsion. The primitive emulsion thus obtained was a monodispersed emulsion of silver iodobromide, 0.4μ in grain size and cubic in crystal habit. The primitive emulsion was redispersed and mixed successively with gelatin and an aqueous potassium iodide solution in an amount corresponding to 1 mole-% of potassium iodide per mole of silver halide. To the emulsion, after having been adjusted to pH 6.5 and pAg 6.2, was added 0.1 mg/mole Ag of thiourea dioxide and the emulsion was ripened at 60° C. for 60 minutes. After addition of 2 mg/mole Ag of potassium choroaurate, the emulsion was again ripened at 60° C. for 60 minutes. To the emulsion, after having been adjusted to pH 5.0 and pAg 8.0, was added 350 mg/mole Ag of a dye (3) represented by the formula Dye (3)

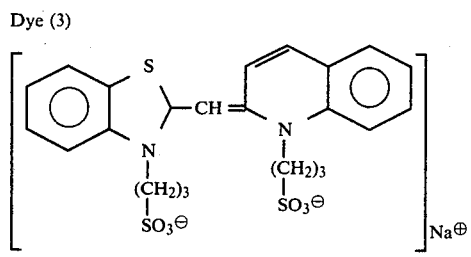

To the emulsion were added successively 140 mg/mole Ag of pinacryptol yellow, a hardener and a surface active agent. The resulting emulsion was coated at a coverage of 3.2 g Ag/m² on polyethylene terephthalate film provided with a subbing coating. The coated film was cut to a suitable size and used as specimen for the test.

(B) Test for development accelerators

Development accelerators shown in Table 5 were each added to the developer solution (I) of the following composition. The above specimen was developed in each of the developer solutions at 20° C. for 3 minutes.

| Developer solution (I) | |
| --- | --- |
| Water (at about 30° C.) | 500 ml |
| Anhydrous sodium sulfite | 30 g |
| Paraformaldehyde | 7.5 g |
| Sodium hydrogen sulfite | 2.2 g |
| Boric acid | 7.5 g |
| Hydroquinone | 22.5 g |
| Potassium bromide | 1.6 g |
| Water to | 1 liter |

The compounds used for comparison were of the following formulas:

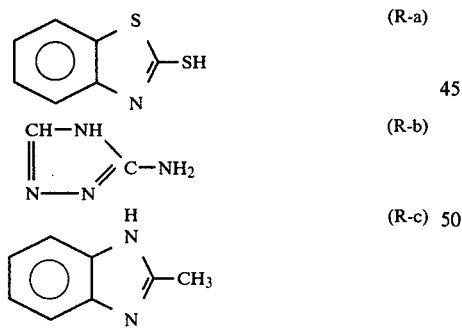

The results obtained were as shown in Table 5.

TABLE 5

| | Development accelerator | |
| --- | --- | --- |
| Run No. | No. | Amount added (mg per liter of developer) | Optical transmission density |
| 1 | Control | 0 | 0.10 |
| 2 | (XI-a) | 1 | 3.30 |
| 3 | (XI-c) | 5 | 2.56 |
| 4 | (XII-b) | 5 | 3.09 |
| 5 | (XIII-a) | 5 | 2.28 |
| 6 | (XIII-b) | 10 | 2.01 |
| 7 | (XIV-a) | 5 | 2.70 |
| 8 | (XIV-b) | 6 | 2.74 |

TABLE 5-continued

| | Development accelerator | | |
| --- | --- | --- | --- |
| Run No. | No. | Amount added (mg per liter of developer) | Optical transmission density |
| 9 | (XIV-c) | 4 | 2.16 |
| 10 | (XIV-d) | 10 | 2.08 |
| 11 | (XIV-e) | 4 | 2.89 |
| 12 | (XIV-f) | 5 | 2.76 |
| 13 | (XIV-g) | 10 | 2.24 |
| 14 | (XIV-h) | 10 | 2.02 |
| 15 | (XV-a) | 5 | 2.45 |
| 16 | (XV-b) | 10 | 2.26 |
| 17 | (XVI-a) | 4 | 2.34 |
| 18 | (XVII-b) | 10 | 2.11 |
| 19 | (XVIII-a) | 10 | 3.08 |
| 20 | (R-a) | 10 | 0.26 |
| 21 | (R-b) | 10 | 0.16 |
| 22 | (R-c) | 10 | 0.15 |

(C) Incorporation of development accelerator in emulsion

Each of the development accelrators being tested was added, in an amount indicated in Table 6, to each portion of the direct-positive emulsion (A) and the emulsion was coated at a coverage of 3.2 g Ag/m² on polyethylene terephthalate film provided with a subbing coating and dried. Each coated sample was developed in the developer solution (I) at 20° C. for 3 minutes. The test results obtained were as shown in Table 6.

TABLE 6

| | Development accelerator | | Optical |
| --- | --- | --- | --- |
| Run No. | No. | Amount added (mg/mole Ag) | transmission density |
| 23 | Control | 0 | 0.10 |
| 24 | (XI-a) | 5 | 3.79 |
| 25 | (XI-c) | 34 | 3.66 |
| 26 | (XII-b) | 17 | 3.54 |
| 27 | (XIII-a) | 34 | 2.42 |
| 28 | (XIII-b) | 136 | 2.14 |
| 29 | (XIV-a) | 34 | 3.65 |
| 30 | (XIV-b) | 34 | 3.64 |
| 31 | (XIV-c) | 272 | 2.25 |
| 32 | (XIV-d) | 272 | 2.09 |
| 33 | (XIV-e) | 34 | 3.50 |
| 34 | (XIV-f) | 34 | 3.26 |
| 35 | (XIV-g) | 68 | 2.22 |
| 36 | (XIH-h) | 340 | 2.01 |
| 37 | (XV-a) | 34 | 3.20 |
| 38 | (XV-b) | 136 | 2.14 |
| 39 | (XVI-a) | 34 | 3.26 |
| 40 | (XVII-b) | 136 | 2.09 |
| 41 | (XVIII-a) | 34 | 3.48 |
| 42 | (R-a) | 68 | 0.32 |
| 43 | (R-b) | 68 | 0.26 |
| 44 | (R-c) | 68 | 0.24 |

As is apparent from Tables 5 and 6, the sample used as control showed an optical transmission density of only 0.10, whereas all of those containing the development accelerators selected by the testing method, as herein specified, showed an optical transmission density of 2.0 or more, indicating improved developability. As shown in Table 6, only a small development accelerating effect was observed with the compound R-a, used for comparison, which is a mercapto-compound and found not suitable for use in this invention, as tested by the specified method. The compound R-b, which is known as development accelerator in the diffusion transfer development, showed also a small development accelerating effect in this invention. Also only a small development accelerating effect was observed with the compound R-c which is a development accelerator for

EXAMPLE 6

A primitive emulsion was prepared in the same manner as in the preparation of primitive emulsion A of Example 1. The primitive emulsion was redispersed and mixed successively with gelatin and an aqueous potassium iodide solution in an amount corresponding to 1 mole-% of potassium iodide per mole of silver halide. To the emulsion, after having been adjusted to pH 6.5 and pAg 5.0, was added 2 mg/mole Ag of chloroauric acid and the emulsion was ripened at 60° C. for 90 minutes. The emulsion was readjusted to pH 5.0 and pAg 8.0 and admixed with 350 mg/mole Ag of a dye (5) of the formula Dye (5)

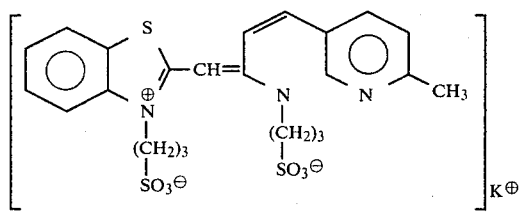

After further addition of 140 mg/mole Ag of pinacryptol yellow, the emulsion was divided into four equal portions. To each of the emulsion, were added a development accelerator shown in Table 7, polyethylene glycol, a hardener and a surface active agent. Each emulsion thus prepared was coated on polyethylene terephthalate film provided with a subbing layer at a coverage of 4.0 g Ag/m² and dried.

The coated specimen thus prepared was cut to a suitable size, exposed through a wedge with 0.15 density step, and developed in the developer solution (I) of Example 5 at 20° C. until the maximum optical density had exceeded 4. The results obtained were as shown in Table 7. In Table 7, the relative sensitivity represents a relative value of reciprocal of the magnitude of exposure required to produce an optical density of 1.0 and $\gamma$ represents the inclination of sensitometric curve between the densities 0.2 and 3.0.

TABLE 7

| Run No. | Development accelerator No. | Amount added, mg/mole Ag | Relative sensitivity | $\gamma$ | Time of development, min. |
|---|---|---|---|---|---|
| 47 | Control | 0 | 100 | 12 | 8 |
| 48 | (XI-a) | 5 | 98 | 12 | 3 |
| 49 | (XIV-b) | 34 | 102 | 11 | 3 |
| 50 | (XV-a) | 34 | 102 | 11 | 3 |

As is apparent from Table 7, by the addition of compounds XI-a, XIV-b, and XV-a, the time of development could be reduced without appreciable changes in photographic characteristics. Similar results were obtained with other development accelerators herein specified.

What is claimed is:

1. A process comprising developing a direct-positive silver halide photographic sensitive material containing a silver halide emulsion layer with an alkaline infections developer solution containing hydroquinone as single developing agent, characterized in that (1) the silver halide emulsion is an externally fogged direct-positive silver halide which contains not less than 70 mole % of bromide, and at least one anionic cyanine dye having a polarographic oxidation halfwave potential of not less positive than +0.3 V and (2) a development accelerator is incorporated in at least one of the layers constituting the silver halide photographic sensitive material, said development accelerator being selected from the group consisting of (1) 2-mercaptoimidazoline and its derivatives of the general formula

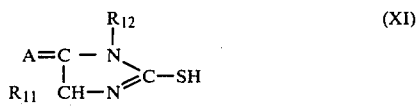

wherein $R_{11}$ and $R_{12}$ each represents hydrogen atom or an alkyl group having 4 or less or carbon atoms (for example, methyl and ethyl radicals), A represents oxygen atom, two hydrogen atoms, or one hydrogen atom and an alkyl group having 4 or less carbon atoms, (2) 2-mercaptoimidazole and its derivatives of the general formula

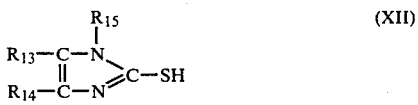

wherein $R_{13}$, $R_{14}$ and $R_{15}$ each represents hydrogen atom or an alkyl group having 4 or less carbon atoms, (3) 2-mercaptobenzimidazole and its derivatives of the general formula

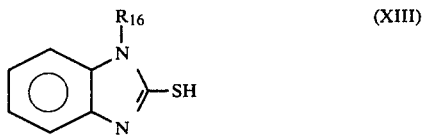

wherein $R_{16}$ represents hydrogen atom or an alkyl group having 4 or less carbon atoms, (4) 2-mercaptotriazole and its derivatives of the general formula

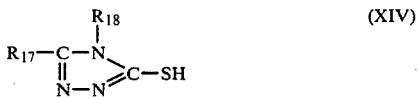

wherein $R_{17}$ represents hydrogen atom or an alkyl group having 4 or less carbon atoms, $R_{18}$ represents hydrogen atom, an alkyl group having 4 or less carbon atoms, allyl group or a group represented by the formula NH-$R_{19}$, where $R_{19}$ represents hydrogen atom or an acyl group having 4 or less carbon atoms (for example, acetyl group or propionyl group), (5) 2-mercaptothiazoline and its derivatives of the general formula

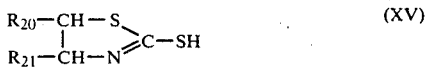

wherein $R_{20}$ and $R_{21}$ each represents hydrogen atom or an alkyl group having 4 or less carbon atoms, (6) 2-mercaptothiazole and its derivatives of the general formula

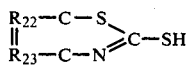
(XVI)

wherein $R_{22}$ and $R_{23}$ each represents hydrogen atom or an alkyl group having 4 or less carbon atoms, and (7) 2-mercaptothiadiazole and its derivatives of the general formula

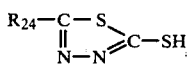
(XVII)

wherein $R_{24}$ represents hydrogen atom, an alkyl group having 4 or less carbon atoms, or a group represented by the formula $NH-R_{25}$, where $R_{25}$ represents hydrogen atom or an alkyl group having 4 or less carbon atoms.

2. A process comprising developing a direct-positive silver halide photographic sensitive material containing a silver halide emulsion layer with an alkaline infectious developer solution containing hydroquinone as single developing agent, characterized in that the silver halide emulsion is externally fogged direct-positive silver halide emulsion containing not less than 70 mole-% of bromide and at least one anionic cyanine dye having a polarographic oxidation halfwave potential not less positive than +0.4 V.

3. A process according to claim 2 or 1, wherein the silver halide emulsion is a silver chloriodobromide emulsion containing not less than 95 mole-% of bromide.

4. A process according to claim 2 or 1, wherein the silver halide emulsion is a silver iodobromide emulsion containing not less than 95 mole-% of bromide.

5. A process according to claim 2 or 1 wherein the silver halide contains an organic desensitizing dye in addition to the anionic cyanine dye having a polarographic oxidation halfwave potential not less positive than +0.4 V.

6. A process according to claim 2 or 1, wherein the anionic cyanine dye having a polarographic halfwave potential not less positive than +0.4 V is a dye represented by the general formula (I):

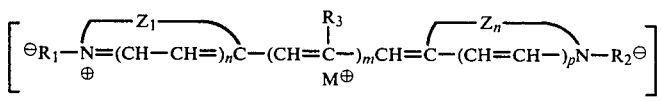
(I)

wherein $Z_1$ and $Z_2$ each represents a non-metallic atom group necessary for completing a nitrogen-containing 5-membered or 6-membered heterocyclic nucleus, $R_1$ and $R_2$ each represents a sulfoalkyl group or a carboxyalkyl group, $R_3$ represents hydrogen atom, an alkyl group or an aryl group, M represents an alkali metal atom or ammonium group, and n, m and p each represents 0 or 1.

7. A process according to claim 6, wherein the cyanine dye represented by the general formula (I) is a dye represented by the general formula (II)

(II)

wherein $Z_3$ represents a non-metallic atom group necessary for completing a nitrogen-containing 5-membered or 6-membered heterocyclic nucleus, $R_4$ and $R_5$ each represents a sulfoalkyl group or a carboxyalkyl group, $R_6$ represents nitro group, a halogen atom or hydrogen atom, $M_1$ represents an alkali metal atom or ammonium group, and $p_1$ represents 0 or 1.

8. A process according to claim 6, wherein the cyanine dye represented by the general formula (I) is a dye represented by the general formula (III)

(III)

wherein $R_7$ represents a sulfoalkyl group or a carboxyalkyl group, $R_8$ represents nitro group, a halogen atom or hydrogen atom, $R_9$ represents an alkyl group, and $M_2$ represents an alkali metal atom or ammonium group.

9. A process according to claim 2 or 1, wherein the amount added of the anionic cyanine dye is $10^{-5}$ to $10^{-1}$ mole per mole of silver halide.

10. A process according to claim 1, wherein the development accelerator is a compound represented by the general formula (XI)

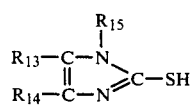
(XI)

wherein $R_{11}$ and $R_{12}$ each represents hydrogen atom or an alkyl group having 4 or less carbon atoms, and A represents oxygen atom, two hydrogen atoms, or one hydrogen atom and one alkyl group having 4 or less carbon atoms.

11. A process according to claim 1, wherein the development accelerator is a compound represented by the general formula (XII)

(XII)

wherein $R_{13}$, $R_{14}$ and $R_{15}$ each represents hydrogen atom or an alkyl group having 4 or less carbon atoms.

12. A process according to claim 1, wherein the development accelerator is a compound represented by the general formula (XIII)

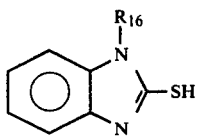

(XIII)

wherein $R_{16}$ represents hydrogen atom or an alkyl group having 4 or less carbon atoms.

13. A process according to claim 1 wherein the development accelerator is a compound represented by the general formula (XIV)

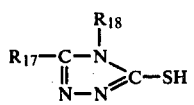

(XIV)

wherein $R_{17}$ represents hydrogen atom or an alkyl group having 4 or less carbon atoms and $R_{18}$ represents hydrogen atom, an alkyl group having 4 or less carbon atoms, allyl group or a group of the formula NH-$R_{19}$ in which $R_{19}$ represents hydrogen atom or an acyl group having 4 or less carbon atoms.

14. A process according to claim 1, wherein the development accelerator is a compound represented by the general formula (XV)

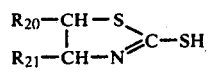

(XV)

wherein $R_{20}$ and $R_{21}$ each represents hydrogen atom or an alkyl group having 4 or less carbon atoms.

15. A process according to claim 1, wherein the development accelerator is a compound represented by the general formula (XVI)

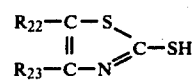

(XVI)

wherein $R_{22}$ and $R_{23}$ each represents hydrogen atom or an alkyl group having 4 or less carbon atoms.

16. A process according to claim 1 wherein the development accelerator is a compound represented by the general formula (XVII)

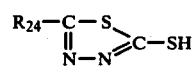

(XVII)

wherein $R_{24}$ represents hydrogen atom, an alkyl group having 4 or less carbon atoms, or a group of the formula NH-$R_{25}$ in which $R_{25}$ represents hydrogen atom or an alkyl group having 4 or less carbon atoms.

17. A process according to claim 1, wherein the amount of the development accelerator incorporated is 0.001 to 1.0 g/mole Ag.

* * * * *